March 23, 1937.  C. L. BUTLER  2,074,827

APPARATUS FOR CONTROLLING THE TEMPERATURE IN ROOMS

Filed Dec. 8, 1933  2 Sheets-Sheet 1

Inventor:
Clifford L. Butler
By Felix Stern
Atty.

March 23, 1937.      C. L. BUTLER      2,074,827
APPARATUS FOR CONTROLLING THE TEMPERATURE IN ROOMS
Filed Dec. 8, 1933      2 Sheets-Sheet 2
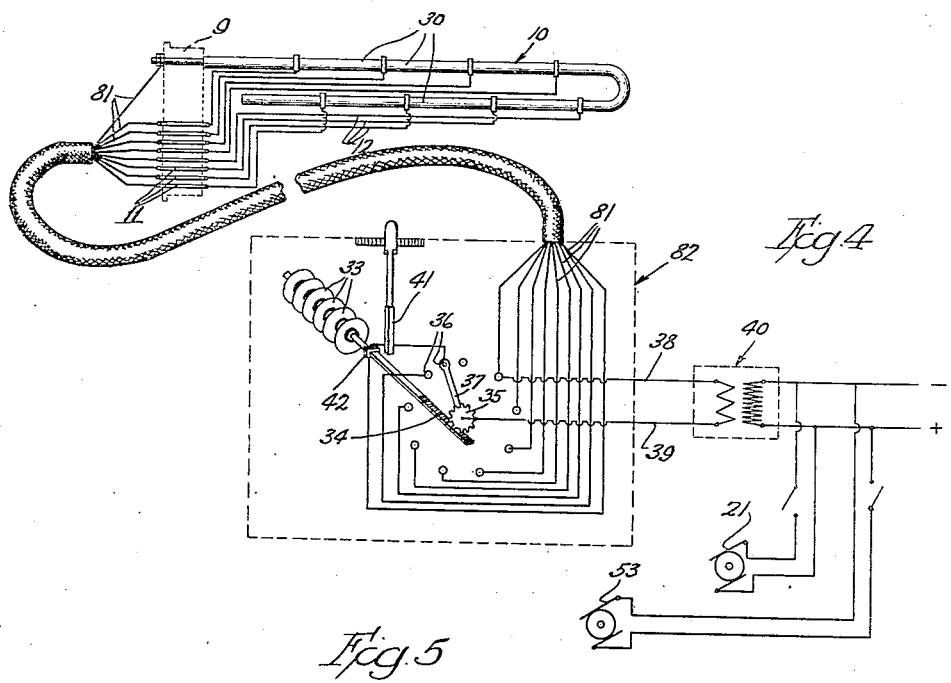
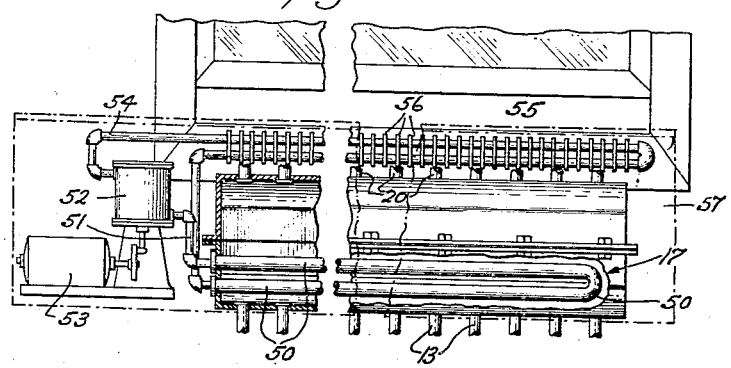
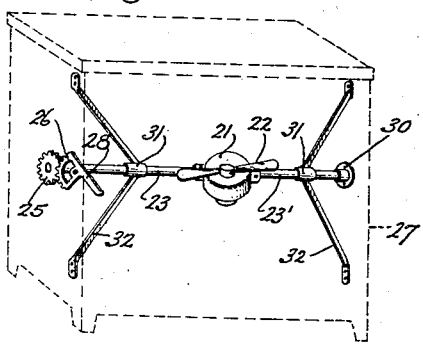
Inventor:
Clifford L. Butler
by Felix Stern
Atty.

Patented Mar. 23, 1937

2,074,827

UNITED STATES PATENT OFFICE 2,074,827

APPARATUS FOR CONTROLLING THE TEMPERATURE IN ROOMS

Clifford L. Butler, Wilmette, Ill.

Application December 8, 1933, Serial No. 701,425

13 Claims. (Cl. 257—9)

This invention relates to improvements in apparatus for controlling the temperature in rooms.

It is an object of the invention to provide an apparatus which will rapidly increase the temperature in a room and then retain within the room a predetermined selective temperature.

It is another object of the invention to provide an apparatus which is suitable not only for increasing the temperature in rooms during the cold season, but which is also adapted to lower the temperature in the interior of rooms during the hot season, and to combine therefore in a single unit, means for maintaining, within certain limits, any selectively determined temperature regardless of the outside temperature.

It is, furthermore, an object of the invention to provide a temperature control apparatus in which a heat transfer medium is stored to provide definitely separate paths for the travel of the heat through such medium, as contrasted with known temperature control apparatus in which the column of the heat transfer medium wherein the heat ascends is in direct contact with the column or path through which the heat has to travel in order to complete a circuit through the heat transfer medium.

An object of the invention, furthermore, is to provide a temperature control apparatus in which a liquid is utilized as a heat transfer medium for conveying the heat from a source to parts from which it may be radiated into the room and to utilize as a transfer medium a fluid which is particularly adapted for the convection or conduction of heat, and which also is adapted to be utilized as a brine when it is desired to utilize the apparatus for lowering the temperature in the room.

Another object of the invention is to provide a temperature control apparatus in which the source of heat for raising the temperature of a heat transfer medium is formed by an electric resistance which is immersed in the heat transfer medium itself, and thereby directly conveys any changes of temperature to said heat transfer fluid.

Another object of the invention is to provide an apparatus of this character in which the source of heat is combined with a device adjustable to a predetermined selective temperature for energizing the source of heat when the temperature in the room to be heated goes below a certain value and for ceasing the energization of the source of heat when the temperature in the room has reached a certain value, thereby permitting the source of heat to be energized solely to the extent to supplement those heat values which ordinarily are lost in the course of time within the room.

Another object of the invention is to provide a temperature control apparatus in which the dissipation of the heat from the transfer medium to the atmosphere in the room may be accelerated owing to the application of a cooling medium to those parts of the transfer fluid which are directed away from the space to be heated.

It is, furthermore, an object of the invention to provide an apparatus in which the lowering of the temperature may be accelerated by directing the heated air of the room into contact with means whose temperature is lower than the temperature of the room and to cause excessive heat values to be dissipated outside the room.

With these and numerous other objects in view, an embodiment of the invention is described in the following specification in which reference is made to the accompanying drawings.

In the drawings:

Fig. 4 shows perspectively a diagram of the heating resistance and the regulator, as well as a general wiring diagram;

Fig. 5 shows partly in section and partly in elevation the cooling unit of the aggregate, and Fig. 6 illustrates a structure for supporting and adjusting the motor.

Figure 1:
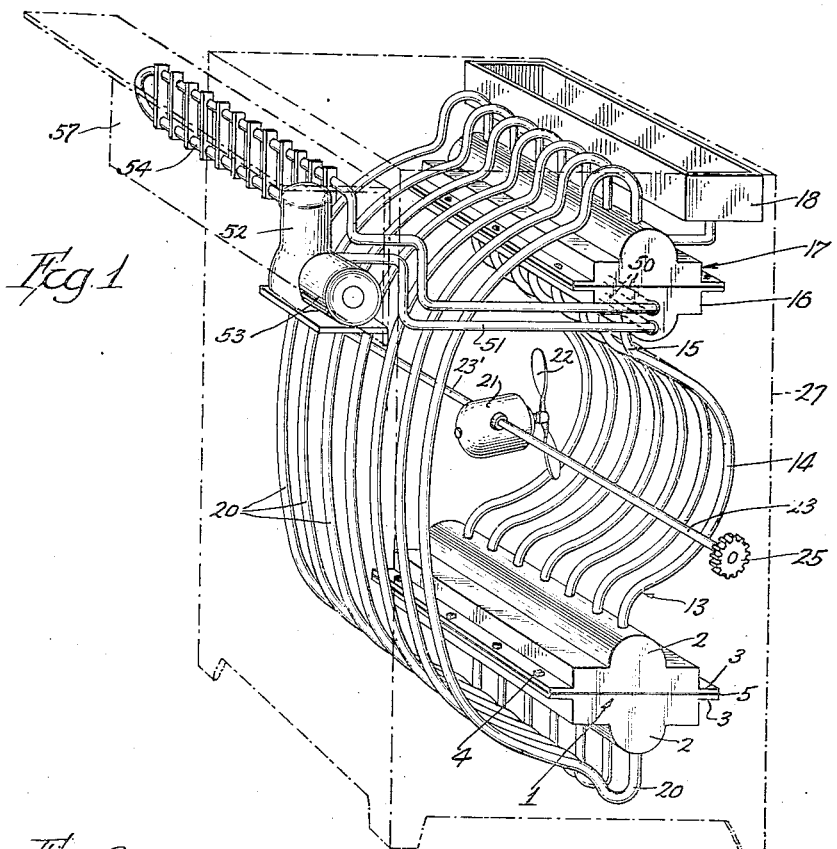
Fig. 1 is a perspective view of an aggregate of this character, with certain parts omitted for the sake of clearness.
Figure 2:
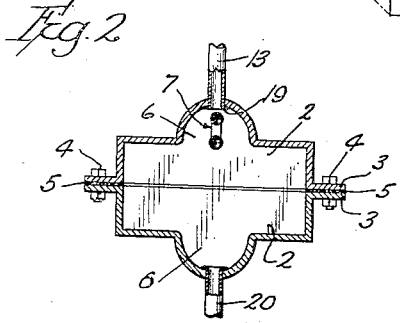
Fig. 2 is a transverse sectional view through the lower chamber of the aggregate.
Figure 3:
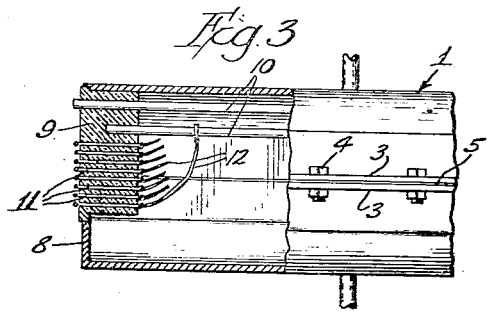
Fig. 3 is a fragmentary longitudinal sectional view of the same.

The embodiment of the temperature control apparatus illustrated by way of example in the drawings, preferably comprises a chamber 1 consisting of two elongated substantially trough-shaped sections 2 of any desired suitable metal, the sections being provided with flanges 3 by means of which they may be placed into abutting relation and held together by means of screws 4 or other fastening means, the gasket 5 being interposed between the flanges when desired. The longitudinal sections 2 of which this chamber 1 is assembled are preferably each provided with a central semi-cylindrical portion 6 in one of which the source of heat 7 is located, namely in the upper one, to assure that the great majority of the heat units emanating from this source are permitted to travel upward in the direction in which the heat normally travels. None of the heat generated by the source 7 for the purpose is, therefore, utilized for raising the temperature of that portion of a heat transfer medium which fills the chamber 1 itself.

The source of heat 7 in the present instance is constituted by a resistance of that type which can be immersed in a fluid heat transfer medium, and for this purpose it is shown as a pair of resistance bars 10 forming part of a substantially hairpin-shaped structure, and made of a metal of high specific resistance, but insulated against the surrounding heat transfer medium.

Metals of this character in the form of rods, bars, coils and the like, are well known and available in the market, and usually are fully enclosed by a protective insulating coating,—an enamel of some type—which is insoluble in the heat transfer fluid, and not attacked by it in any other way. A metal rod of high specific resistance dipped into molten glass to retain a coating of glass surrounding it on all sides may advisably be used for this purpose.

This resistance element extends longitudinally of the chamber 1 in the upper extension 6 of the control apparatus, and in the embodiment illustrated, it is secured in one end wall 8 of the same, for which purpose this end wall may be provided with an opening thru which a plug 9 carrying the resistance element 10 may firmly be secured to the wall of the chamber. The plug 9 is preferably sealed into the end wall and also contains, sealed into the insulating compound of which the plug is made, the electrical terminal 11, to which in the interior of chamber 1, conductors 12 properly insulated, may be secured.

A plurality of pipes 13 extend from the apex of the upper section 2 of this chamber, and in order to provide for a great length of path of the heat, these pipes in the embodiment illustrated, are bent outward to be concave at 14 in direction towards the room to be heated. The upper ends 15 of the pipes 13 are secured in the lower section 16 of another chamber 17 which is advisably disposed parallel to the lower chamber 1 and of equal length therewith, the two chambers preferably occupying substantially the same vertical plane. The pipes 13, therefore, may act as supports for the upper chamber 17, the construction of which is substantially identical with that of the lower chamber,—the two chambers and the entire assembly of pipes being filled with a suitable heat transfer medium.

To observe the maintenance of the body of fluid in the pipes and chambers of the system an expansion tank 18, in a position permitting inspection and filling, is provided and connected with the upper chamber.

In order to facilitate the attachment of the pipes to the sections 2 and 16 of the chambers 1 and 17 respectively, the sections are provided with suitable openings through which the pipes are inserted, and the inserted portions of the pipes are then upset at 19 to provide flanged portions in the interior of the chambers, these flanges also serving to prevent the leakage of the heat transfer fluid about those end portions of the pipe which are positioned in the respective sections.

Upon energization of the source of heat, the heat units or values generated thereby will be communicated to the transfer fluid. The heat within said transfer fluid will rapidly travel in the only available path from the upper section 2 of the lower heat chamber through the entire assembly of pipes 13, whereby upon continued use of the apparatus, heat would be accumulated in said upper chamber.

In order to provide a path which is available solely for the return flow of these heat units or values, separate from the circuit in which the heat travels upward in the transfer fluid, a separate set of pipes 20 extends from the top of the upper section of the upper chamber 17 and terminates in the bottom portion 6 of the lower section of the lower chamber 1.

Each pair of pipes for the flow and return flow may, therefore, be considered a complete winding of a coil for the flow of heat, similar to the flow of electric current in a wire coil, all windings being connected with two chambers from which the heat values emanate and into which they are discharged respectively. As the heat, which has been transmitted by the resistance element 10 to the fluid, moves upward within the individual tubes 13, following the well known laws of thermal motion, this heat also is transferred by conduction or convection to the walls of the pipe until these walls have reached a temperature equal to the temperature of the transfer fluid at the respective point of transfer.

The pipes 13 surrender their heat content to the atmosphere, and as the heat values in the transfer fluid are replenished by generation of new heat values from the source of heat 7, the temperature of the atmosphere within the room will be gradually raised.

In order to transmit the entire heat values created by the source of heat to the atmosphere of the room, it is obviously necessary that the volume of fluid must be sufficient to carry this heat, and it also is desirable that the surrender of heat from the tubes shall take place at such speed that the heat transfer fluid in the return tubes 20 will at the point of return to lower chamber 1, have a temperature approximately equal to that temperature which would be present if no source of heat were located within this circuit. It may then be assumed that the entire heat contents originating with the source of heat has been discharged from the system and that this heat contents has been fully transferred to the room.

The temperature control apparatus as described, therefore, provides a radiator which embraces a self-contained closed circuit combined with means for producing a flow of heat in a predetermined direction through the same. While it had been proposed heretofore in central heating plants to provide a closed circuit for the heat transfer medium, the individual radiators in these systems merely constituted containers for fixed quantities of the heat transfer fluid.

In the common radiator in which the transfer fluid is merely stored to surrender its heat values to the atmosphere, the entire wall surface of the radiator has approximately the same temperature. The greater heating efficiency of the apparatus of the present invention is due to the fact that the conduits of the radiator which are directed away from the room are caused to remain in relatively cool condition. The distribution of the heat values for better utilization in the atmosphere of the room is accomplished in the system of the present invention by dissipating the heat from that conduit portion which is directed towards the room, and by providing a separate return circuit for the fluid which has surrendered its heat to the atmosphere.

This delivery of heat from the transfer fluid and tubes to the atmosphere of the room may be greatly accelerated without, at any time, increasing the temperature of the transfer fluid itself and of the tubes beyond a mean temperature, if the walls of the tubes 13 are artificially maintained at a heat potential considerably below that created by the source of heat. In order to cool, therefore, the tubes 13 containing the transfer fluid, a cooling means shown by way of example in the form of a fan 22 operated by an electric motor 21 may be disposed in the interior of this closed self-contained circuit. It may become advisable to vary the direction of the current of air created by this blower in respect of the heat delivery tubes 13, and for this purpose the motor is shown to be supported by longitudinally disposed rotatable rods 23, 23' mounted in the interior of the coil.

The adjustment structure of the supporting rods for the blower motor to direct the air at various angles into the room is diagrammatically shown by way of example in Fig. 6. A projecting end of rod 23 is provided with a pinion 25 with which a geared sector 26 pivotally mounted on the outside of the casing 27 is in engagement. This sector 26 is provided with a handle 28 accessible from the interior of the room to be heated. By means of this handle 28, the supporting rods 23, 23' may be rotated to turn the motor to any position within an angle of 180 degrees.

The supporting rods advisably are each carried in a bearing 30 fixedly connected with one end wall of the casing 27 in which the entire device is enclosed. Another bearing 31 for each rod may be mounted in the interior of the casing, as for instance, on a bracket 32 securable to the end wall of the casing.

Upon energization of the resistance element 10 located in the top section 2 of the lower chamber 1, the heat generated will be communicated to the transfer fluid in the chamber 1 and tubes 13. In order to control the temperature, the heating resistance 10 may be divided into a plurality of individual resistance sections 30 suitably connected with each other, each of these sections being connected by conductor 12, terminals 11 and conductor 81, to a contact element which forms a part of a thermostat regulator 82.

The thermostat 82 may consist of a plurality of diaphragms 33 in bellows form adapted to expand or contract in accordance with the increase or decrease of temperature in the room in which this series of diaphragms is located. This diaphragm assembly carries a rack bar 34 which is in engagement with a pinion 35 mounted centrally of a group of contacts 36 which are severally connected by conductors 81 and conductors 12 with the various sections 30 of the resistance element 10. An arm 37 is fixedly connected with the pinion 35 and is adapted to slide over the various contacts 36 during the rotary movement of the pinion. Conductor 38, 39 connected through one of the respective contacts 36 with one end of the resistance element 10 and with a source of energy, here diagrammatically indicated as a transformer 40 for stepping up the amperage may complete the circuit.

It will be seen, therefore, that upon expansion or contraction of the diaphragms 33, more or less resistance is connected in the circuit, and in accordance with the greater or smaller resistance, more or less heat is generated. It is also obvious that by adjustable stops 41, 42, or some other suitable devices, the expansion and contraction of the diaphragms 33 may be limited so as to maintain the flow of the current thru the resistance within certain limits.

This diaphragm thermostat regulator, however, does not form a part of the present invention, and it is illustrated here simply by way of example. Any desirable thermostat of known construction may be utilized for increasing or decreasing respectively the ohmic resistance from which the generation of heat is made dependent.

The arrangement of the return tubes 20 extending from the upper portion of the top section of the upper chamber 17, may be utilized as a means for cooling the room when desired. For this purpose, a cooling pipe 50 is located in the top chamber 17 which in this manner becomes that part of a refrigerating system which usually is termed the evaporator. This cooling pipe 50 may carry a suitable refrigerating fluid adapted to absorb considerable heat when converted from liquid to gaseous state. Many of these fluids are well known in the art. A pipe 51 extends from this evaporator tube 50 to a compressor 52 exteriorly located of the entire device and actuated by an electric motor 53 with which the compressor or pump may be directly coupled. The compressor outlet is connected with a condenser tube or coil 54 advisably disposed adjacent a window opening 55, and this condenser coil may be provided with ribs 56 or fins or the like also, as is well known in the art, from refrigerator systems in actual use. The cooling system described comprising the compressor 52, the condenser coil 54 and the evaporator 50, is shown in its most simplified construction and may be equipped with additional regulating means which form no part of the present invention.

The flow of the heat in the heat transfer fluid contained in pipes 13 and 20 and in chambers 1 and 17 will now take place in a direction opposite to that previously described. Owing to the location of the evaporator pipe 50 near the deepest point of chamber 17, the cooled heat transfer fluid will travel downward in pipes 13, and the heat potential will be higher in tubes 20. The main withdrawal of the heat from the room, however, is due to the dissipation of heat units through condenser coil 54.

Obviously the temperature in the majority of rooms has to be lowered slightly only to render them comfortably habitable, even at very high summer temperature.

An angular wall 57 is shown interposed (in dash-dotted lines in Figs. 1 and 5) between the condenser 54 and housing 27 to obstruct radiation from the condenser in direction towards the pipes 20, and to create a flue in which the warm air from the interior of the room is drawn downward and outward towards the window opening 55.

In operation of this part of the device the refrigerant will expand when relieved of pressure, and by this expansion to vaporous form will absorb heat units from the surrounding medium, so that this surrounding medium thereby will be cooled. The compressor 52 will then re-compress the vapors of this cooling medium to liquid form, and from this liquefied cooling medium, the heat units contained therein may be dissipated by radiation. This radiation may be amplified by blowing cold air against the condenser pipe 54. If the device is installed near a window opening 55, as is very frequently the case with modern radiators, the condenser coil or pipe 54 may for instance be located above the interspace between the back of the radiator casing 29 and the wall directly below the window opening. Upon opening the window, the heat contained in the compressed cooling fluid will be dissipated and escape thru the window, and this effect may be enhanced by placing a blower motor adjacent the cooling coil or utilizing the motor 21 and fan 22 located in the interior of the pipes for this purpose.

It is obvious, therefore, that the entire device, as described in the present application, represents a self-contained aggregate which not only can be utilized in the cold season to heat an enclosed area, as for instance, a room, but that also during the warm season the temperature may be controlled by cooling the fluid in the lower section of the top chamber and dissipating the heat units which become free during the absorption or vaporization of a refrigerant.

The operation of this cooling system also obviously may be rendered automatic by the use of the diaphragm thermostat regulator or any other suitable thermostatic regulator adapted to start and stop the motor of the compressor when certain temperature limits have been reached. Thermostatic regulators of this type are in common use. It would, however, also be feasible to successively connect regulator contacts of a suitable rheostat with the field of the motor for the compressor, whereby the compressor may be caused to operate at a greater or smaller speed depending upon the temperature conditions within the room as compared with the temperature outside the room.

It is, furthermore, obvious that the flow of heat in the transfer medium and eventually also the circulation of this fluid itself will take place in opposite directions depending on the use of the device for heating or cooling purposes respectively.

In the ordinary central heating system, as employed at the present time, water is normally used as the heat transfer fluid and also in transportable radiators, heated by gas or electricity, water constitutes the heat transfer fluid.

A compound of sodium with water would increase the conductivity of the water, and for this purpose the heat transfer fluid utilized in the present application is a fluid containing the sodium compound in dissolved condition. The saturation of the water with sodium chloride produces a heat transfer fluid which has been shown to be superior to water in every respect. With an aqueous solution of sodium chloride fully saturated, the present radiator is adapted to transmit the heat instantaneously, and the heat in the fluid itself will move at a considerably greater velocity over greater distances without being retarded by the body of the fluid itself,—or in other words, it is not absolutely necessary to set up a circulation of the fluid.

I claim:

1. A temperature control apparatus, in the form of a self-contained transportable unit comprising an elongated chamber, a source of heat located in the upper portion thereof, a series of pipes extending from the top of the elongated chamber, a second elongated chamber in the bottom of which said conduits terminate the conduits being deflected between said chambers towards one side of the plane containing the axes of the chambers, and a second set of conduits extending from the top of the second chamber to the bottom of the first chamber the second set being deflected towards the opposite side of said plane, the pipes and chambers containing a heat transfer fluid.

2. A temperature control apparatus in the form of a self-contained transportable unit, comprising an elongated chamber, a source of heat located in the top portion of the chamber, a plurality of conduits extending from the top of said chamber upward, a second elongated chamber in which the upper ends of the conduits are inserted at the bottom of said second chamber, a second set of conduits extending from the top of said second chamber to the bottom of the first chamber, the conduits in the two sets being located in vertical planes the conduits in the two sets being oppositely deflected in respect of a plane containing the axes of the two chambers, and the chambers and conduits containing a heat transfer fluid.

3. A temperature control apparatus in the form of a self-contained transportable unit, comprising an elongated chamber, a source of heat located therein near the top thereof, a plurality of pipes extending from the top of said chamber upward and being deflected outward intermediate their ends, a second elongated chamber in which the upper ends of said first named conduits are inserted at the bottom thereof, and a plurality of conduits extending from said second chamber near the top thereof to the bottom wall of the first named chamber with which they communicate, the second named conduits being transversely spaced from said first named conduits, and the conduits and chambers containing a heat transfer fluid.

4. A temperature control apparatus in the form of a self-contained transportable unit, comprising an elongated chamber, a source of heat in the interior thereof, a plurality of pipes extending from said chamber adjacent said source of heat, another elongated chamber in which said pipes terminate, a second plurality of pipes leading from said second chamber to said first named chamber, said pipes and chambers containing a heat transfer liquid and an adjustable blower located between the two sets of pipes and adapted to deliver air selectively to either of said sections.

5. A temperature control apparatus in the form of a self-contained transportable unit, comprising a double set of pipes, chambers uniting the two sets at their upper ends and at their lower ends, heat generating means in the lower chamber, and heat withdrawing means located in the upper chamber.

6. A temperature control apparatus in the form of a self-contained transportable unit, comprising an elongated chamber, a source of heat in the interior thereof, a plurality of pipes extending from said chamber upward, another elongated chamber parallel to said first named chamber and in communication with said pipes, a second set of pipes extending from said upper chamber to the lower chamber, an evaporator pipe within said second chamber, and means for circulating a refrigerant through said evaporator pipe, said chambers and pipes being filled with a heat transfer liquid.

7. A temperature control apparatus, comprising an elongated chamber, an electric resistance element in the interior of said chamber, a plurality of pipes extending upward from said chamber, another chamber parallel to said first named chamber and communicating with the upper ends of said pipe, an evaporator located within said upper chamber, and a means exterior of said pipes and chamber for circulating a refrigerant through said evaporator pipe, said pipes and chambers containing a heat transfer fluid.

8. A temperature control apparatus in the form of a self-contained transportable unit, comprising a chamber having an electric resistance in its upper part, a plurality of pipes extending upward from the upper part of said chamber, another chamber in communication with the upper ends of said pipes, a second set of pipes extending from the upper portion of said second chamber to the lower portion of said first named chamber, an evaporator located in the lower portion of said upper chamber, a compressor and a condenser, said compressor being located in a circuit containing said condenser and said evaporator, the chambers and pipes containing a heat transfer fluid.

9. A temperature control apparatus in the form of a self-contained transportable unit, comprising an elongated chamber, an electric resistance element located in the upper portion of said chamber, a plurality of pipes extending upward from the upper part of said chamber, a second chamber parallel to said first named chamber in communication with the upper ends of said pipes, a second set of pipes extending from the top of said second chamber to the bottom portion of said first named chamber, a thermostat control for said resistance element, an evaporator located in the lower part of said second chamber, a compressor outside said pipes and chambers, means for actuating said compressor, a condenser, said condenser and evaporator being connected with said compressor, a blower located between the two sets of pipes, the pipes and chambers containing a heat transfer fluid.

10. An air conditioning apparatus in the form of a self-contained transportable unit comprising a chamber, an evaporator located therein, means outside said chamber for compressing a refrigerant and forcing said refrigerant through said evaporator, a plurality of pipes, each in the form of a closed conduit extending from said chamber and returning to the same, said chamber and conduits containing a heat transfer fluid, and means surrounded by said conduit for directing air against selected portions thereof.

11. An air conditioning apparatus in the form of a self-contained transportable unit, comprising a pair of elongated parallel chambers vertically spaced from each other, an evaporator located in the lower part of the upper chamber, a source of heat located in the upper part of the lower chamber, a set of pipes extending from the upper portion of the lower chamber to the lower portion of the upper chamber, another set of pipes extending from the upper part of the upper chamber to the lower part of the lower chamber, the two sets of pipes being horizontally spaced from each other, a blower adjustably mounted between the two sets of pipes, a compressor, a condenser extending parallel to the upper chamber, the compressor being adapted to circulate a refrigerant through said condenser and through said evaporator, said chambers and pipes being filled with a heat transfer fluid.

12. An air conditioning apparatus in the form of a self-contained transportable unit, comprising a pair of elongated chambers vertically spaced from each other and located in the same vertical plane, a source of heat disposed in the upper portion of the lower chamber, a set of pipes extending from the upper portion of the lower chamber to the lower portion of the upper chamber, an evaporator disposed in the lower portion of the upper chamber, a second set of pipes extending from the upper portion of the upper chamber to the lower portion of the lower chamber, the two sets of pipes being horizontally spaced from each other, an expansion tank in communication with the upper chamber, a blower adjustably mounted in the space between the two sets of pipes, a compressor, a condenser extending parallel to the upper chamber, said condenser and evaporator being in communication with said compressor and said chambers, pipes and expansion tank containing a heat transfer liquid.

13. A transportable temperature control unit comprising a chamber, an electric heating element in said chamber, a conduit extending from said chamber upward, a reservoir in which said conduit terminates at its upper end, a return conduit extending from the reservoir to the chamber and containing a portion located at a level below the level of the chamber, the conduit being continued from said lower portion upward into the chamber, the conduits being spaced from each other, a blower being located between the conduits and above the chamber, and a heat transfer medium filling said chamber, conduits and reservoirs.

CLIFFORD L. BUTLER.